United States Patent [19]

Paul, III

[11] 3,951,898

[45] Apr. 20, 1976

[54] BLENDS OF POLYSULFIDE POLYMER LATICES WITH URETHANE PREPOLYMERS TO PRODUCE AN IMPROVED SEALANT AND CAULKING COMPOSITION

[75] Inventor: Henry N. Paul, III, Blue Bell, Pa.

[73] Assignee: Thiokol Corporation, Newtown, Pa.

[22] Filed: May 13, 1974

[21] Appl. No.: 469,207

Related U.S. Application Data

[63] Continuation of Ser. No. 316,168, Dec. 18, 1973, abandoned.

[52] U.S. Cl. ................ 260/29.6 NR; 260/29.2 TN; 260/33.8 UB; 260/40 TN; 260/858; 260/859 R
[51] Int. Cl.² ................ C08L 75/06; C08L 81/04
[58] Field of Search ...... 260/858, 29.2 TN, 29.6 NR

[56] References Cited
UNITED STATES PATENTS

| | | | |
|---|---|---|---|
| 2,465,513 | 3/1949 | Carasso | 260/29.2 R |
| 2,929,794 | 3/1960 | Simon et al. | 260/858 |
| 2,998,413 | 8/1961 | Holtschmidt et al. | 260/858 |
| 3,077,464 | 2/1963 | Simon et al. | 260/858 |
| 3,770,678 | 11/1973 | Paul | 260/28 |

OTHER PUBLICATIONS

Industrial & Engineering Chem., Vol. 42, Nov. 1950, pp. 2217–2223, Fettes et al.

Primary Examiner—Wilbert J. Briggs, Sr.
Assistant Examiner—A. H. Koeckert
Attorney, Agent, or Firm—Stanley A. Marcus; Royal E. Bright

[57] ABSTRACT

A polysulfide polymer latex is blended with a urethane prepolymer to produce a sealant composition having improved physical properties. The resulting sealant composition may be employed in various sealing caulking applications.

10 Claims, No Drawings

BLENDS OF POLYSULFIDE POLYMER LATICES WITH URETHANE PREPOLYMERS TO PRODUCE AN IMPROVED SEALANT AND CAULKING COMPOSITION

This is a continuation of application Ser. No. 316,168 filed Dec. 18, 1973, and now abandoned.

BACKGROUND OF THE INVENTION

1. Field of the Invention

This invention relates to polysulfide polymer latex based sealant and caulking compositions. More particularly, this invention relates to polysulfide polymer latex-urethane prepolymer sealant compositions having significantly improved physical properties.

2. Description of the Prior Art

Polymer latex based caulking compositions are known in the art. They are economically attractive sealant compositions characterized by their excellent application characteristics; i.e., they are readily gunned, troweled, or beaded onto various surfaces. These latex caulks have been extensively used for a variety of coating, caulking, and grouting applications, e.g. sealing panes of glass to window frames, sealing cracks in concrete structures, sealing basedboard and trim seams, sealing around bath tubs, sealing boat hulls, etc. Latex based caulking compositions of the prior art have in general been based upon solvent or water dispersions of such polymers as the polyacrylates, polyvinyl acetates, polysulfides and the like. In addition to the polymer latex, these prior art latex based caulking compositions frequently contained special purpose additives such as fillers, plasticizers, adhesive additives, latex stabilizers, and the like. As is known to those skilled in the art, latex caulks of the above type do not cure in the standard sense. That is, they do not cure through the use of oxidative curing agents or crosslinkers but rather attain their maximum physical properties through solvent or water evaporation and subsequent coalescing of the dispersed polymer particles.

While the latex caulks referred to above have proven useful in certain applications, they all have been found to possess several serious shortcomings. Thus, the prior art latex caulks exhibited relatively low physical properties, moderate to high shrinkage, poor underwater adhesion, poor resistance to rain washout and high cost. In addition to the foregoing disadvantages prior art polysulfide latex caulks often exhibited objectionable odors.

In addition to the latex caulks, 100% solids moisture and air curable sealants are also in common usage. Two common types are polysulfide and polyurethane based. These sealants have little or no shrinkage, high physical properties, and good resistance to washout prior to ultimate cure. However, they have the disadvantages of slow cure, long "paint-over" times, poor sag resistance, poor blading properties, difficult clean-up problems, poor one-package stability, difficult production problems, erratic adhesion values, and high cost. 100% Solids moisture curable sealants based on blends of urethane prepolymers with SH terminated liquid polysulfide polymers are also known in the art. Thus, U.S. Pat. No. 2,929,794 describes a sealant composition comprising from 5–95% by weight of an amine curable urethane prepolymer and from 95–5% by weight of an SH terminated liquid polysulfide polymer, co-cured with a mixture of an amine catalyst for the urethane and a peroxide catalyst for the SH terminated liquid polysulfide polymer.

The sealant compositions of the present invention are readily distinguishable from the compositions of U.S. Pat. No. 2,929,794. Thus, the product of the reaction of the urethane prepolymer with the SH terminated liquid polysulfide polymers described in the patent must produce a block copolymer. This necessarily occurs since the NCO terminals of the urethane prepolymer will react with the SH terminals of the liquid polysulfide polymers to produce a copolymer containing alternating block or segments of each polymer. On the other hand, the compositions of the present invention employ a polysulfide polymer latex of a high molecular weight polysulfide polymer which does not have SH terminals as indicated in the description of the polysulfide polymer latex which follows. Accordingly, the product of the urethane prepolymer and polysulfide polymer latex of the present compositions is a mixture of fully chain extended polymers rather than a block copolymer as necessarily results from the patented compositions. Moreover, the compositions of the present invention are further distinguishable from the compositions of the above mentioned patent in that no separate curing agents are required for the polysulfide polymer latex or the urethane prepolymer. This is true since the polysulfide polymer latex requires no oxidative curing agent as it does not contain SH terminals, but cures merely through a coalescing of polymer particles on evaporation of water from the latex while the urethane prepolymer cures by utilizing the water from the polysulfide polymer latex.

Moreover, the urethane prepolymer-SH terminated liquid polysulfide polymer blends described in U.S. Pat. No. 2,929,794 exhibit the same disadvantages as the 100% solid moisture curable polysulfide or polyurethane based sealants referred to previously, e.g., slow cure, long paint-over times, poor blading properties, poor physical properties, etc.

The polysulfide latex-urethane prepolymer blends of the present invention achieves virtually all of the advantages of the prior art latex caulks (including prior polysulfide latex caulks) and the 100% solids moisture curable one-package sealants but without most of their disadvantages. Thus, the polysulfide latex-urethane prepolymer blend compositions of the present invention is an economically attractive sealant having improved tensile, elongation, adhesion, and sag resistance as well as relatively rapid drying times, short paint-over times, and excellent application characteristics. Moreover, the polysulfide latex-urethane prepolymer blends of the present invention can be readily cleaned up with water. This last feature is especially attractive in confined areas where solvent odors are objectionable. Finally, the sealant composition of the present invention is relatively odor free.

Accordingly, it is an object of the present invention to produce a polysulfide latex based sealant and caulking composition having improved physical properties. More particularly, it is an object of the present invention to produce a polysulfide latex based sealant and caulking composition having improved tensile, elongation, adhesion, sag resistance, resistance to rain washout, and application characteristics. It is a still further object of the invention to produce a sealant and caulking composition which is readily cleaned up with water and is relatively odor free. Further objects of the invention will be readily apparent to those skilled in the art from the detailed description which follows.

SUMMARY OF THE INVENTION

It has been surprisingly and unexpectedly discovered that the objectives set forth above can be accomplished by blending a polysulfide polymer latex with a urethane prepolymer to produce a sealant composition consisting essentially of:

a. from about 10% to about 20% by weight of total composition of a polysulfide polymer latex;
b. from about 15% to about 30% by weight of total composition of a urethane prepolymer; and
c. from about 40% to about 60% by weight of total composition of special purpose additives.

DESCRIPTION OF THE PREFERRED EMBODIMENTS

As indicated above, the sealant and caulking composition of the present invention contains three major components, i.e., (1) the polysulfide polymer latex, (2) the urethane prepolymer, and (3) special purpose additives.

1. The Polysulfide Polymer Latex

Polysulfide polymer latices or water dispersions (hereinafter referred to as polysulfide polymer latex or laticies) are known in the art. These polysulfide polymer latices are based on polysulfide polymers having the general structure $—(RS_x)_n—$. As indicated by the general structure, these polymers do not contain active terminals and therefore do not respond to vulcanization with oxidizing agents. Chemically, these polymers are defined as condensation products of an alkaline polysulfide and suitable polyhalides. These polysulfide polymer latices are therefore physically and structurally different than the liquid polysulfide polymers (i.e., liquid polythiopolymercaptan polymers having the structure $HS—(RSS)_x—RSH$) which are well known to those in the sealant arts. Polysulfide polymer latices and their method of preparation are described in an article by Fettes and Jorczak, Industrial and Engineering Chemistry, Vol. 42, November, 1950, page 2217; also see the article by Bertozzi in Rubber Chemistry and Technology, Vol. 41, No. 1, February 1968, page 157. Examples of polysulfide polymer latices are those designated MX and WD-6, as described in the article by Bertozzi. As described therein, these type polysulfide polymer latices have been employed in a variety of coating applications. While polysulfide polymer latices of the MX or WD-6 type may be useful in the sealant composition of the present invention, they are not especially favored because they have a tendency to impart some degree of odor to the finished caulking composition. Accordingly, a special polysulfide polymer latex designed to be economically attractive and relatively odor free is especially preferred for use as the polysulfide polymer latex of the present invention. This special polysulfide polymer latex is prepared by reacting a 20% excess of an alkaline polysulfide, preferably sodium polysulfide, with bis-2-chloroethyl formal in a water medium employing techniques and procedures such as those described in the Fettes and Jorczak or Bertozzi articles described above to produce a polysulfide polymer latex wherein the polymer has the general structure $—(RS_x)_n—$, wherein R is the ethylene formal radical $—CH_2—CH_2O—CH_2—O—CH_2—CH_2—$, $x = 2.20$ to $2.30$, $n =$ about 500, and the polymer has a molecular weight of about 100,000. For a detailed description of the preparation of this special polysulfide polymer latex, see my co-pending application (711-B1) incorporated herein by reference.

The polysulfide polymer latex of the present invention may be employed in amounts of from about 10% to about 20% by weight based upon the total weight of the composition.

2. The Urethane Prepolymer

The urethane prepolymers which may advantageously be employed in the compositions of the present invention may have an ester or ether backbone. Thus, urethane prepolymers derived from the reaction of polyester polyols or polyether polyols with organic isocyanates or diisocyanates may be employed. In general, the urethane prepolymers employed in the compositions of the present invention should have an NCO content of from 4 to 10 weight percent, preferably 5 to 8 weight percent. It has been found that urethane prepolymers having NCO contents much above or below this range produce only marginal improvements in physical properties when blended with the polysulfide latex to produce the finished sealant compositions of the present invention. As will be apparent to those skilled in the art, the NCO content of the urethane prepolymer can be adjusted by reacting a molar excess of diisocyanate with the polyester or polyether polyol.

The urethane prepolymers which may be employed in the sealant compositions of the present invention are prepared in known manner by reacting a hydroxyl terminated polyether or polyester with a suitable diisocyanate to produce an isocyanate terminated prepolymer.

The isocyanates used may be any of those previously proposed for the preparation of urethanes including arylene polyisocyanates such as tolylene, metaphenylene, 4-chlorophenylene-1,3-, methylene-bis-(phenylene-4-, bisphenylene-4,4'-,3,3'-dimethoxy-bisphenylene-4,4'-, 3,3'-diphenylbiphenylene-4,4'-, naphthalene-1,5-and tetrahydro naphthalene-1,5-diisocyanates; alkylene polyisocyanates such as ethylene, ethylidene, propylene-1,2-butylene-1,4-, butylene-1,3-, hexylene-1,6-, decamethylene-1,10-, cyclohexylene-1,2-, cyclohexylene-1,4-, and methylene-bis-(cyclohexyl-4,4'-)diisocyanates.

Polyether polyols which may be reacted with the above diisocyanates to produce polyether based urethane prepolymers which may be suitably employed in the compositions of the present invention are for example, diethylene glycol, triethylene glycol, tetraethylene glycol, polybutylene glycol, polypropylene glycol, polyoxypropylene glycol, and the like.

As indicated previously, in order to achieve a urethane prepolymer having a suitable NCO content, the polyether polyol can be reacted with a molar excess of diisocyanate in known manner. For example, a particularly preferred polyether based urethane prepolymer having an NCO content of about 5.6% was produced by reacting 0.5 moles of Niax 1025, a polypropylene glycol available from Union Carbide having an OH number of 111.4, a molecular weight of about 1008, and a viscosity at 25°C. of 145 centistokes, with 1.0 moles of Hylene TM tolylene diisocyanate (a mixture of 80 parts of 2,4 isomer and 20 parts 2,6 isomer).

Alternatively, a commercially available polyether based prepolymer having a suitable NCO content can be used.

Polyester polyols which may be reacted with the above diisocyanates to produce suitable polyester based urethane prepolymers are for example, hydroxyl terminated polyesters prepared in known manner from dibasic acids such as adipic, succinic, maleic, and fumaric acids condensed with diols or triols such as ethylene glycol; propane-1,2-diol; propane-1,3-diol; diethylene glycol; pentane-1,5-diol; neopentyl glycol; 2-2,dihydroxy methyl dihydropyran; 2-butyne-1,4-diol; and 1,2,6 hexane triols. As described above, the NCO content of the polyester based urethane prepolymer may be controlled by reacting a molar excess of the diisocyanate with the polyester polyol.

A particularly preferred polyester based urethane prepolymer employed in the sealant compositions of the present invention is identified as SOLITHANE ZL-670, a polyester based urethane prepolymer having an NCO content of 7.5% derived from the reaction of tolylene diisocyanate with poly-80/20 ethylene/propylene adipate available from Thiokol Chemical Corporation.

One of the salient features of the compositions of the present invention is that the urethane prepolymers employed in the compositions of the present invention do not require a separate curing agent since the water of the polysulfide polymer latex component of the composition serves to cure the urethane prepolymer.

The urethane prepolymer employed in the compositions of the present invention may be used in amounts of from about 15% to about 30% by weight of total composition.

3. Special Purpose Additives

In addition to the polysulfide polymer latex component and the urethane prepolymer component, the sealant compositions of the present invention may contain various inert materials commonly employed in polysulfide based and polyurethane based sealant compositions. For convenience sake, these inert materials are hereinafter referred to as special purpose additives. The special purpose additives commonly employed in the above mentioned sealant compositions are for example, fillers, plasticizers, adhesive additives, stabilizers, and the like. In general, the amount and type of special purpose additives which may be employed is dependent upon the application for which the sealant composition is intended. In the present compositions, the fillers that may be used include calcium carbonate, talc, mica, magnesium oxide, titanium dioxide, silica, and fibers. Plasticizers that may be used among others include chlorinated biphenyl, chlorinated terphenyl, and chlorinated hydrocarbons, as well as mixtures of these. Adhesive additives that may be used among other include acrylic resins, polyacrylate resins, and phenolic resins as well as mixtures thereof. A preferred adhesive additive for use in the compositions of the present invention is a polyethyl acrylate solution containing 50% solids identified as Rhoplex E-32 available from Rohm & Haas. In addition to the above materials, the compositions of the present invention may also contain a stabilizer for the polysulfide polymer latex such as an 11% solution of sodium polyacrylate in water identified as Alcogum 5950 available from Alco Chemical and a material to reduce $CO_2$ sponging caused by the reaction of the NCO terminal of the urethane prepolymer with $H_2O$ such as an extra light magnesium oxide identified as Elastomag 100 available from Morton Salt.

The special purpose additives employed in the composition of the present invention may be present in amounts of from about 40% to about 60% by weight of the final sealant composition.

4. Preparation of the Sealant Composition

The sealant compositions of the present invention should be prepared in two package form. The most efficient procedure is to prepare one-package containing the polysulfide polymer latex admixed with the desired special purpose additives and a second package containing the urethane prepolymer admixed with the anti-sponging agent. This procedure assures adequate pot-life since no curing will begin until the ingredients of the two-packages are combined just prior to application at the job site.

In admixing the polysulfide polymer latex with the desired special purpose additives and the urethane prepolymer with the anti-sponging agent, mixing equipment and procedures which are standard in the polysulfide sealant arts may be employed. The ingredients of the two packages are combined in well known manner just prior to application of the sealant at the job site. Thus, the contents of the two packages may be combined by employing suitable portable mixing equipment and measuring scales commonly used where two package sealant compositions are involved. Alternatively, a very simple procedure may be employed with the two-package sealant compositions of the present invention. In this latter procedure, the two packages are combined simply by measuring out the ingredients by means of sight only. This latter procedure may be employed because of the relatively simple ratios of polysulfude polymer latex composition to urethane prepolymer which may be used. For example, ratios of polysulfide polymer latex composition (i.e. polysulfide polymer latex plus special purpose additives) to urethane prepolymer (i.e., urethane prepolymer plus anti-sponging agent) of 1:1 to 3:1, preferably 2:1, can be used.

The following examples are intended to further illustrate the nature of the present invention and are not intended as a limitation thereon.

EXAMPLE 1

This example illustrates the preparation of a polyether based urethane prepolymer having an NCO content of about 5.6% for use in the compositions of the present invention.

The polyether urethane prepolymer was prepared by reacting Niax 1025 a polypropylene glycol having an OH number of 111.4, a molecular weight of about 1008, and a viscosity at 25°C. of 145 centistokes with Hylene TM tolylene diisocyanate (a mixture of 80 parts of 2,4-isomer and 20 parts of 2,6-isomer). Thus 504 grams of Niax 1025 polyol (0.5 mole) was dried by heating to 100°C. and pulling a 40 mm vacuum for 30 minutes. The system was cooled to 60°C. and 174 grams of Hylene TM (1.0 mole) and 5 drops of stannous octoate were added. The exotherm resulting was allowed to carry the temperature to 90°C. This temperature was maintained for 3 hours under nitrogen with agitation. On cooling the polyether prepolymer was stored under nitrogen. Analysis of the prepolymer disclosed that the NCO content was 5.6% (theoretical 6.2%).

The prepolymer of this example was utilized in examples 2–4 which follow.

EXAMPLES 2 – 4

In these examples, the physical properties of a polysulfide polymer latex based sealant composition were compared to the physical properties of the same type composition blended with the polyether based urethane prepolymer of Example 1.

The formulation identified as Part A (Example 2) below served as the control formulation. A portion of the Part A formulation was then blended with varying amounts of the polyether based urethane prepolymer of Example 1 identified as Part B to form Examples 3 and 4.

The various formulations were prepared by utilizing standard sealant mixing equipment and procedures. The control formulations and test formulations were then cast into 6 × 6 strips and allowed to air cure for 4 days at room temperature. Physical properties were determined on cured samples by means of an Instron tensile tester in known manner. Formulations and test results are shown below. In the formulations all parts are by weight unless otherwise specified.

| Example No. | 2 (Control) | 3 | 4 |
|---|---|---|---|
| Formulations | | | |
| Part A | | | |
| ZW-679 Polysulfide Polymer Latex (60% solids)[1] | 110 | 110 | 110 |
| Rhoplex E-32 (50% solids)[2] | 25 | 25 | 25 |
| $CaCO_3$ | 150 | 150 | 150 |
| $TiO_2$ | 15 | 15 | 15 |
| Alcogum 5950 (11% in $H_2O$)[3] | 12 | 12 | 12 |
| Aroclor 5442 (Chlorinated Terphenyl) | 50 | 50 | 50 |
| Cereclor 51L (Chlorinated Hydrocarbon) | 50 | 50 | 50 |
| Total Part A | 412 | 412 | 412 |
| Part B | | | |
| Niax 1025/TDI Prepolymer of Example No. 1 | — | 100 | 150 |
| Elastomag 100 (Extra light MgO) | — | 30 | 30 |
| Total Part A + Part B | 412 | 542 | 592 |
| Physical Properties | | | |
| Tensile, psi | 30 | 314 | 296 |
| Elongation, % | 200 | 215 | 320 |

The above data shows that a polyether based urethane prepolymer significantly improves the physical properties of the sealant composition.

1. ZW-679 is a polysulfide polymer latex having the general structure $—(RS_x)_n—$ wherein R is the ethylene formal radical $CH_2—CH_2O—CH_2—O—CH_2—CH_2$, $x = 2.20$ to $2.30$, $n =$ about 500, and the polymer has a molecular weight of about 100,000 and has no crosslinking.
2. Rhoplex E-32 is a polyethyl acrylate solution containing 50% solids employed as an adhesive additive.
3. Alcogum 5950 is an 11% solution of sodium polyacrylate in water and is employed as a latex stabilizer.

EXAMPLES 5 – 7

These examples illustrate additional polyether based urethane prepolymers having NCO contents in the desired range which may be employed in the sealant compositions of the present invention. The prepolymer would be prepared in a manner similar to that described in Example 1. Proportions of ingredients are shown in mole %.

| Example No. | 5 | 6 | 7 |
|---|---|---|---|
| Ingredients (Mole %) | | | |
| Tolylene diisocyanate (80/20 mixture of 2,4/2,6 isomers) | 72.8 | 66.7 | 66.7 |
| Polypropylene glycol 1000 M.W. | 27.2 | — | — |
| Polypropylene Glycol 1500 M.W. | — | 33.3 | — |
| Polytetramethylene ether glycol 1000 M.W. | — | — | 33.3 |
| Theoretical NCO content | 7.6% | 4.5% | 6.2% |

The above polyether based urethane prepolymers are substitutable for the polyether based urethane prepolymers of Examples 3 and 4. Physical properties of the sealant composition would show a significant increase compared to the Control formulation of Example 2.

EXAMPLES 8 – 9

In these examples, a sealant composition containing a polyester based urethane prepolymer was compared to the Control formulation of Example 2. The formulations were prepared and tested in the manner described in Examples 2–4. Adhesion results were obtained by applying a bead of uncured sealant formulation to the substrate, allowing the sealant to cure to the substrate, and then attempting to remove the bead by hand.

Formulations and test results are shown below:

| Example No. | 8 | 9 |
|---|---|---|
| Formulations | | |
| Part A | | |
| ZW-679 Polysulfide latex (60% solids) | 110 | 110 |
| Rhoplex E-32 (50% solids) | 25 | 25 |
| $CaCO_3$ | 150 | 150 |
| $TiO_2$ | 15 | 15 |
| Alcogum 5950 (11% in $H_2O$) | 12 | 12 |
| Aroclor 5442 (chlorinated terphenyl) | 50 | 50 |
| Cereclor 51L (chlorinated hydrocarbon) | 50 | 50 |
| Total Part A | 412 | 412 |
| Part B | | |
| SOLITHANE ZL-670 Urethane prepolymer* | — | 200 |
| Elastomag 100 (extra light MgO) | — | 30 |
| Total Part A + Part B | 412 | 642 |
| Physical Properties | | |
| Tensile, psi | 30 | 440 |
| Elongation, % | 200 | 390 |
| Adhesion to Concrete | | |
| 7 Days Air at 75°F. | Fair | Very Good |
| 7 Days in R. T. Water | Fair | Fair |
| Adhesion to Aluminum | | |
| 7 Days Air at 75°F. | Excellent | Very Good |

*SOLITHANE ZL-670 is a poly -80/20 ethylene/propylene adipate ester based urethane prepolymer having an NCO content of about 7.5 weight percent, available from Thiokol Chemical Corporation.

EXAMPLES 10 – 11

These examples illustrate additional polyester based urethane prepolymers having NCO contents in the desired range which may be employed in the sealant compositions of the present invention. The proportions shown below are in mole %.

| Example No. | 10 | 11 |
|---|---|---|
| Ingredients (Mole %) | | |
| Tolylene diisocyanate | 72.7 | 80 |
| Poly(oxydiethylene glycol adipate) 1500 M.W. | 27.3 | — |
| Poly(oxydiethylene glycol adipate) 2000 M.W. | — | 20 |
| NCO Content theoretical | 5.7% | 6.2% |

The above polyester urethane prepolymers are substitutable for the polyester based urethane prepolymer of Example No. 9. Physical properties of the finished sealant composition would show an increase when compared to the Control formulation of Example 2.

I claim:

1. A process for making a polysulfide polymer latex based sealant composition which comprises reacting an isocyanate-terminated urethane prepolymer having an NCO content of from 4% to 10% by weight with a water dispersion of a normally solid high molecular weight polysulfide polymer substantially free of thiol terminals and having about 60% solids content, said polysulfide polymer having in its polymeric chain recurring radicals selected from the group hydrocarbon, or oxahydrocarbon radicals linked by sulfur linkages.

2. A process as in claim 1 additionally containing special purpose additives selected from the group consisting of fillers, plasticizers, adhesive additives, latex stabilizers, and anti-sponging agents.

3. A process as in claim 2 wherein the polysulfide polymer of the polysulfide polymer water dispersion has a molecular weight of about 100,000 with no cross-linking and has the structure $-(RS_x)_n-$, wherein R is the ethylene formal radical $$-CH_2CH_2-O-CH_2O-CH_2-CH_2-$$

$x$ is from 2.20 to 2.30, and $n$ is about 500.

4. A process as in claim 2 wherein the urethane prepolymer is a poly-80/20 ethylene/propylene adipate ester based urethane prepolymer having an NCO content of about 7.5 weight percent.

5. A process as in claim 2 wherein the fillers are $CaCO_3$ and $TiO_2$, the plasticizers are a mixture of chlorinated terphenyl and chlorinated hydrocarbon, the adhesive additive is polyethyl acrylate, the latex stabilizer is sodium polyacrylate, and the anti-sponging agent is magnesium oxide.

6. A polysulfide polymer based sealant composition which comprises the reaction product of an isocyanate-terminated urethane prepolymer having an NCO content of from 4% to 10% by weight and a water dispersion of a high molecular weight polysulfide polymer having about 60% solids content, said polysulfide polymer having in its polymeric chain recurring radicals selected from the group hydrocarbon, or oxahydrocarbon radicals linked by sulfur linkages.

7. A composition as in claim 6 additionally containing special purpose additives selected from the group consisting of fillers, plasticizers, adhesive additives, latex stabilizers, and anti-sponging agents.

8. A composition as in claim 7 wherein the polysulfide polymer of the polysulfide polymer water dispersion has a molecular weight of about 100,000 with no cross-linking and has the structure $-(RS_x)_n-$, wherein R is the ethylene formal radical $$-CH_2-CH_2-O-CH_2O-CH_2-CH_2-$$

$x$ is from 2.20 to 2.30, and $n$ is about 500.

9. A composition as in claim 7 wherein the urethane prepolymer is a poly-80/20 ethylene/propylene adipate ester based urethane prepolymer having an NCO content of about 7.5 weight percent.

10. A composition as in claim 7 wherein the fillers are $CaCO_3$ and $TiO_2$, the plasticizers are a mixture of chlorinated terphenyl and chlorinated hydrocarbon, the adhesive additive is polyethyl acrylate, the latex stabilizer is sodium polyacrylate, and the anti-sponging agent is magnesium oxide.

* * * * *

UNITED STATES PATENT OFFICE
CERTIFICATE OF CORRECTION

Patent No. 3,951,898     Dated April 20, 1976

Inventor(s)  Henry N. Paul, III

It is certified that error appears in the above-identified patent and that said Letters Patent are hereby corrected as shown below:

Column 4, line 2, delete "(711-B1)" and insert -- filed October 2, 1972, now Patent No. 3,770,678 --;

Column 10, line 8, after "a" insert -- normally solid --;

Column 10, line 8, after "polysulfide polymer" insert -- substantially free of thiol terminals and --.

Signed and Sealed this

Second Day of November 1976

[SEAL]

Attest:

RUTH C. MASON
Attesting Officer

C. MARSHALL DANN
Commissioner of Patents and Trademarks